June 11, 1946.  E. B. ANDERSON  2,402,006
UNIVERSAL JOINT
Filed Oct. 16, 1943
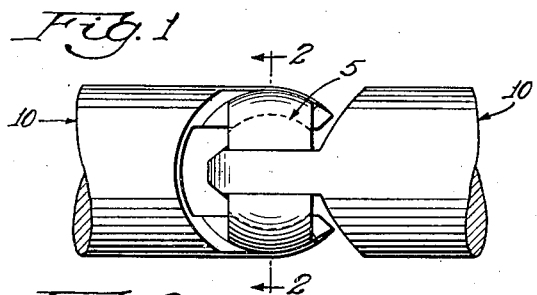
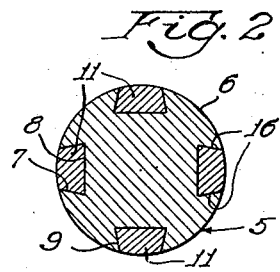
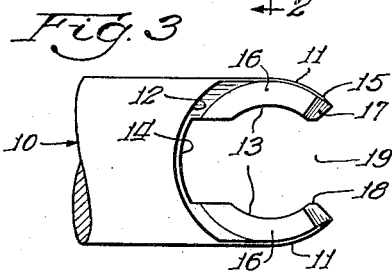
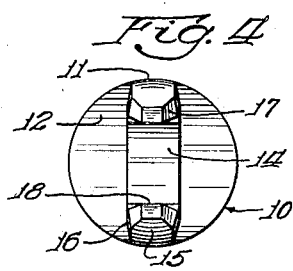
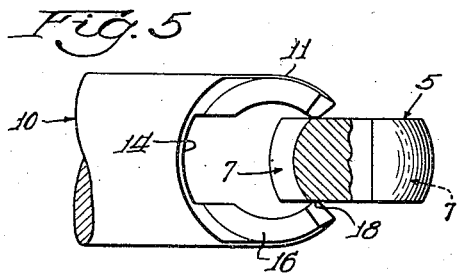
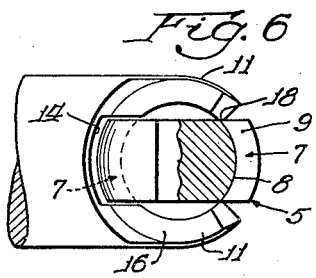
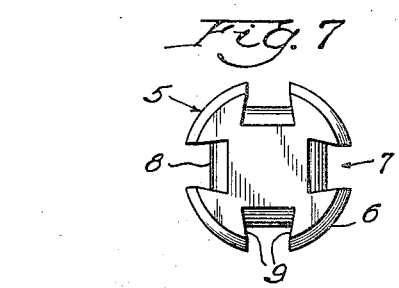
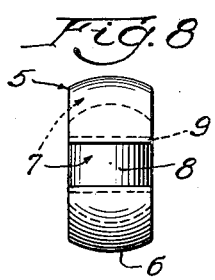
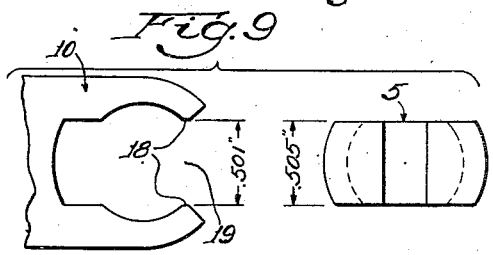
Inventor:
Edmund B. Anderson
By Edward C. Dietzgen
Atty.

Patented June 11, 1946

2,402,006

UNITED STATES PATENT OFFICE 2,402,006

UNIVERSAL JOINT

Edmund B. Anderson, Rockford, Ill., assignor to Borg-Warner Corporation, Chicago, Ill., a corporation of Illinois Application October 16, 1943, Serial No. 506,473

5 Claims. (Cl. 64—16)

The present invention relates to a Hooke's joint or universal joint for power transmission where the proximate ends of two shafts having intersecting axes are connected to transmit motion and power from a drive shaft to a driven shaft.

More particularly, the present improvements relate to a novel arrangement for connecting the furcations or arms of the yokes to the center member of a universal joint.

Some of the principal objects of this invention are to simplify the construction, reduce the expense and to improve the efficiency and operation of such a universal joint as is disclosed herein.

The present improvements aim to provide a universal joint wherein the furcations or arms of the yokes and the seats in the center member provide an interlocking arrangement that effectively prevents lateral or radial displacement or dislodgement of the yoke arms from the center member.

Another object of these improvements resides in the provision of an arrangement wherein it is necessary to spring the arms away from each other during the operation of assembling the parts of the joint so that the arms are effectively locked to prevent the joint becoming separated, when it is not installed in an operating position.

It is a further object to provide a universal joint wherein the yoke arms and their seats or guides in the center member are of dove-tail shape in cross-section and such formation extends throughout the entire length of each arm and each seat. Also the fork opening in the yoke between the outer ends of the arms is of less dimension than the transverse dimension or width of the center member to effect a springing movement of the arms away from each other when the parts are being assembled.

Additional objects, aims and advantages of the present invention will be apparent to those skilled in the art after the construction and operation of the universal joint is understood from the within description.

It is preferred to accomplish the numerous objects of this invention and to practice the same in substantially the manner hereinafter fully described and, as more particularly pointed out in the appended claims, reference being made to the accompanying drawing that forms a part of this specification, wherein:

Fig. 1 is a longitudinal side elevational view showing a preferred embodiment of the universal joint contemplated herein;

Fig. 2 is a transverse section thereof taken on line 2—2 of Fig. 1;

Fig. 3 is a view in elevation of one of the yokes detached from the universal joint;

Fig. 4 is a view looking at the right hand end of Fig. 3;

Fig. 5 is a graphic view illustrating the manner of assembling a yoke with the center member;

Fig. 6 shows the same parts when assembled;

Fig. 7 is a face elevation of the center member;

Fig. 8 is an edge elevation of the center member; and

Fig. 9 is a diagram illustrating proportional dimensions of certain parts of the universal joint.

The drawing is to be understood as being more or less of a schematic character for the purpose of disclosing a typical or preferred form of the improvements contemplated herein, and in the drawing like reference characters identify the same parts in the several views.

The structure illustrated embodies a center member 5 that is a disc of the desired diameter and thickness having flat parallel sides or faces and an arcuate or curved peripheral edge 6, that is convex in cross-section preferably having a curvature such as would be developed in the forming of a sphere of the radius of said disc. The convex curvature of the edge is not essential and the above-described pattern is more or less optional. The peripheral edge of the disc is provided with transverse channels or grooves 7 the inner or bottom surfaces 8 of which are of arcuate or convex shape throughout their length. The curvature of these bottom surfaces may be substantially concentric with the transverse curvature of the edge surface of the disc, but they should be arcs of a circle struck from the axis of the center member.

The side walls 9 of these channels or grooves are undercut in the manner shown in Figs. 2 and 7 to adapt the channels for assembly with the arms of the yokes that interlock therewith. In the universal joint shown there are four of these channels 7 that are arranged in diametrically disposed radial pairs for coactive assembly with the bifurcated or forked ends of the yoke couplings.

One of these yoke coupling members is illustrated in detail in Figs. 3 and 4 that show side and end views thereof. A yoke coupling comprises a cylindrical body 10 adapted for connection in any suitable manner to the end of a driving or driven shaft (not shown) and said body 10 is provided at one end with a pair of spaced arms 11 that are preferably integral with it and project from diametrically opposite sides of concave shoulders 12 at the end of the body. The confronting or facing surfaces 13 of the arms are concavely curved, the arcs of which are developed from a common center in order to conform with the curvature of the inner or bottom surfaces 8 of the channels 7 in the center member. Throughout the portions of the arms that are engaged with the channels these elements are counterparts of each other and interfit in a manner that permits relative movement of one part with respect to the other. At their inner ends these arms 11 are separated or spaced from each other by a concave recess 14 that provides clearance for the tips of the arms of the opposing yoke during rotative movement of the universal joint and during the operation of assembling the parts of the universal joint.

The outer portions of the arms 11 curve inwardly toward each other as shown at 15 in Fig. 3 and in cross-section it will be seen that the longitudinal sides 16 of these arms are converged toward each other from their inner corners to their outer corners in the manner shown in Figs. 2 and 3 to conform to the cross-sectional shape of the channels 7 in the edge of the center member. The arms 11 and the channels 7 interfit in the manner of the tenon and mortise of a dovetail and the arcuate form of these elements permits a sliding movement of one of them with respect to the other. This interlocking or dovetail arrangement also prevents any tendency of the arms 11 to move away from each other or bend outward due to a longitudinal pull on a lateral stress that may be exerted against them.

The outer ends of the arms 11 preferably have beveled or rounded portions 17 that reduce their transverse dimensions at their tips to provide clearance when the ends of the arms enter the recess 14 during rotative movement of the universal joint or during assembly of the yokes and center member as hereinafter described. The outer portions of these arms are of a lunate or horn-shape with tips 18 that project inwardly toward each other and provide a gap 19 between them.

By reference to Fig. 2, it will be seen that in cross-section the arms and channels are of trapeziform with the wide bases innermost and the narrow bases forming the outer faces of the arms.

The manner of assembling the parts of this universal joint is graphically illustrated in Figs. 5 and 6. In this connection attention is directed to the diagram (Fig. 9) wherein it is shown that the width of the gap 19 between the tips 18 is less than the thickness of the disc embodying the center member 5.

In assembling the yoke with the center member, the arms 11 are forced apart or spring away from each other by pushing the center member between the tips at one of the channels 7 as shown in Fig. 5. This will engage the tips 18 with the flat sides of the center member. The relative movement is continued to cause the tips 18 to pass diametrically across the center member until said tips snap into the opposite channel 7 as shown in Fig. 6. In this latter position (Fig. 6) the distance between the tips 18 is less than the thickness of the disc forming the center member so that dislodgement of the yoke is prevented. Thereafter the arms 11 may be readily entered in their respective channels by a rotative movement of the center member or by a swinging movement of the yoke around the axis of the center member. The second yoke is assembled with the center member in the same manner as above described, and during this step one of the arms of the second yoke will be inserted through the recess 14 between the arms of the first-assembled yoke. After assembly of the yokes with the center member, any longitudinal stress or pull in the direction of the axes of the yokes will tend to cause the tips 18 to cam outward by their engagement with the curved bottom surfaces 8 of the channels 7. This will force the side faces 16 of the yoke arms against the undercut side faces 9 of the channels which will effectively resist a spreading of the yoke arms.

While the invention has been described in detail in its preferred form or embodiment, it will be apparent to those skilled in the art, after understanding the improvements, that various changes and modifications may be made therein without departing from the spirit or scope thereof.

I claim:

1. A universal joint embodying a center member comprising a circular disc having transverse channels in diametrically opposite portions of its periphery, and oppositely extending yokes cooperatively engaged with said channels, said yokes comprising spaced arms slidably fitting the peripheral channels in said center member, the said arms and the said channels embodying counterpart elements of trapeziform cross-section that are disposed with the wide bases thereof innermost to effect a locking engagement of the arms with the channels and resist dislodgement of the arms in a lateral or radial direction with respect to the center member.

2. A universal joint embodying a center member having flat sides, and a plurality of diametrically opposite peripheral channels extending transversely across the edge of the center member, and yokes comprising arms cooperating with said center member, the channels and arms having interfitting dovetail portions extending throughout the length of their engaged faces, the tips of said arms being disposed beyond the planes of the sides of the center member and the tips of the arms of each yoke spaced from each other a distance less than the thickness of the center member to arrest movement of the arms in a direction longitudinally of the axis of a yoke.

3. A universal joint embodying a center member comprising a circular disc having transverse channels in diametrically opposite portions of its periphery, the longitudinal sides of said channels having under-cut flat surfaces throughout their length, and the bottoms of said channels curved outward between the ends of said channels, and oppositely extending yokes, each comprising spaced arms slidably engaged in said channels, said arms having arcuate confronting faces, and the sides of said arms having outwardly converging faces that coact with the under-cut sides of the channels to prevent movement of the arms in lateral directions away from each other.

4. A universal joint as defined in claim 3, wherein each yoke is provided with a recess between the inner portions or roots of its arms to effect clearance for the tips of the other yoke arms during rotative movement of the universal joint, said recesses providing means whereby assembly of the center member with a yoke may be effected by edgewise insertion of the disc.

5. In a universal joint including a pair of yokes, a center member comprising a disc having flat sides and having a periphery of convex arcuate shaped in cross-section, and a plurality of diametrically disposed channels extended inwardly from the periphery of said disc, said channels having uninterrupted undercut flat side walls and having arcuate convex bottom faces that curve outward between the ends of said channels, the said channels having a trapeziform cross-section.

EDMUND B. ANDERSON.